(12) United States Patent
Oleske

(10) Patent No.: US 10,131,110 B2
(45) Date of Patent: Nov. 20, 2018

(54) ACOUSTICAL STRUCTURE

(71) Applicant: ARMSTRONG WORLD INDUSTRIES, INC., Lancaster, PA (US)

(72) Inventor: Peter J. Oleske, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 14/904,963

(22) PCT Filed: Jul. 15, 2013

(86) PCT No.: PCT/US2013/050542
§ 371 (c)(1),
(2) Date: Jan. 14, 2016

(87) PCT Pub. No.: WO2015/009279
PCT Pub. Date: Jan. 22, 2015

(65) Prior Publication Data
US 2016/0159028 A1    Jun. 9, 2016

(51) Int. Cl.
*B32B 3/12* (2006.01)
*B32B 5/02* (2006.01)
(Continued)

(52) U.S. Cl.
CPC .............. *B32B 3/12* (2013.01); *B32B 5/022* (2013.01); *B32B 5/024* (2013.01); *B32B 13/08* (2013.01);
(Continued)

(58) Field of Classification Search
CPC ........... B32B 3/12; B32B 5/022; B32B 5/024; B32B 13/08; B32B 15/04; B32B 17/02; B32B 17/06; B32B 2307/102
(Continued)

(56) References Cited

U.S. PATENT DOCUMENTS 3,977,492 A    8/1976   Hankel
4,585,685 A *  4/1986   Forry ................... E04B 1/8409
                                                       156/62.8
(Continued)

FOREIGN PATENT DOCUMENTS

CN      102241166 A    11/2011
EP        1164228 B1   12/2001
EP        2388135      11/2011

OTHER PUBLICATIONS

International Search Report for corresponding PCT/US2013/050542, dated Apr. 8, 2014. WO.
(Continued)

*Primary Examiner* — Edgardo San Martin
(74) *Attorney, Agent, or Firm* — Craig M. Sterner

(57) ABSTRACT

A light-weight acoustical substrate is disclosed. In one embodiment, the substrate includes a substantially open core and outer facing layers. The core is comprised of a plurality of open, cells which extend between the facing layers. The cells may have numerous configurations, including honeycomb. The facing layers may be non-woven or woven glass scrims in some embodiments, A multi-layered acoustical structure is provided which in one non-limiting embodiment is comprised of two cores with outer facing layers and an interlayer between the cores.

20 Claims, 7 Drawing Sheets

(51) Int. Cl.
  *B32B 13/08* (2006.01)
  *B32B 17/02* (2006.01)
  *B32B 15/04* (2006.01)
  *B32B 17/06* (2006.01)
  *B32B 5/00* (2006.01)
(52) U.S. Cl.
  CPC .............. *B32B 15/04* (2013.01); *B32B 17/02* (2013.01); *B32B 17/06* (2013.01); *B32B 2307/102* (2013.01)
(58) Field of Classification Search
  USPC .................. 181/290, 291, 292, 288
  See application file for complete search history.

(56) References Cited

U.S. PATENT DOCUMENTS

| | | | | |
|---|---|---|---|---|
| 4,641,726 | A * | 2/1987 | Fearon | E04B 1/8209 156/290 |
| 5,022,943 | A * | 6/1991 | Zaima | B29D 24/005 156/221 |
| 5,424,497 | A * | 6/1995 | Dias | E04B 1/86 181/286 |
| 5,874,161 | A * | 2/1999 | Pape | B27N 7/005 106/816 |
| 6,296,075 | B1 | 10/2001 | Gish et al. | |
| 6,509,081 | B1 | 1/2003 | Diamond | |
| 6,630,222 | B1 | 10/2003 | Fay et al. | |
| 7,591,346 | B2 * | 9/2009 | Thompson, Jr. | B32B 5/02 156/196 |
| 8,371,084 | B2 * | 2/2013 | Babineau, Jr. | E04B 9/001 181/286 |
| 8,387,747 | B2 * | 3/2013 | Koike | B32B 3/12 181/284 |
| 8,511,429 | B1 * | 8/2013 | Yu | E04B 9/045 181/290 |
| 8,684,134 | B2 * | 4/2014 | Dugan | E04B 1/8409 181/290 |
| 9,334,059 | B1 * | 5/2016 | Jones | B64D 33/02 |
| 2002/0011380 | A1 * | 1/2002 | Alter | G03B 21/56 181/295 |
| 2007/0134466 | A1 | 6/2007 | Rajaram | |
| 2011/0266088 | A1 | 11/2011 | Koike et al. | |

OTHER PUBLICATIONS

Corresponding Search Report for CN 2013800783626, dated Nov. 21, 2016. CN.

Documents cited in Notice of Grant for corresponding RU 2016104768. RU.

* cited by examiner

| Height (in) | Cell Size (in) | Front Surface mks Rayls | Middle Layer mks Rayls | Back Layer mks Rayls | Sound Absorption Four Frequency Average |
|---|---|---|---|---|---|
| 1.08 | 0.50 | 150 | - | 500 | 0.87 |
| 1.08 | 0.50 | 150 | | 4500 | 0.85 |
| 1.08 | 0.50 | 150 | | 6100 | 0.74 |
| 1.08 | 0.50 | 500 | - | 330 | 0.91 |
| 1.08 | 0.50 | 4500 | | 150 | 0.75 |
| 1.08 | 0.50 | 6100 | | 150 | 0.53 |
| | | | | | |
| .89 | 0.50 | 150 | | 1500 | 0.80 |
| .82 | 1.00 | 150 | | 500 | 0.88 |
| .82 | 1.00 | 150 | | infinite | 0.45 |
| .82 | 1.00 | 500 | | infinite | 0.63 |
| 1.50 | 1.00 | 150 | 500 | infinite | 0.66 |
| | | | | | |
| 1.89 | 0.50 and 1.00 | 500 | 330 | infinite | 0.95 |
| 1.89 | 0.50 and 1.00 | 500 | 300 | 500 | 0.97 |
| 1.99 | 0.50 and 1.00 | 500 | 150 | infinite | 0.87 |

FIG. 8

ACOUSTICAL STRUCTURE

CROSS-REFERENCE TO RELATED APPLICATIONS

This application is a National Stage of International Application No. PCT/US13/50542, filed Jul. 15, 2013. The disclosure of the above application is incorporated herein by reference.

FIELD OF THE INVENTION

The present invention relates to acoustical structures, and more particularly to light-weight acoustical structures characterized by a high noise reduction coefficient.

BACKGROUND OF THE INVENTION

Acoustical substrates are used in a variety of noise reduction applications inside a building structure to create sound controlled room environments. The substrates may be formed into acoustical panels that can be applied to the walls, ceilings (in some instances forming a suspended ceiling system), and acoustical sound treatments or canopies. Acoustical panels with a high noise reduction coefficient (NRC) as established by testing standards such as ASTM C423 (reverberation room method) or ASTM C384 (impedance tube method) are desirable. The NRC provides a relative measure of the percentage of sound that an acoustical structure will absorb versus reflect. An NRC value equal to or greater than 0.65 to 1.0 is generally considered a high NRC, which ideally indicates that more of sound incident on the panel will be absorbed than reflected back to the room. These acoustical panels are preferably self-supporting; however, such acoustical panels may sometimes be heavy and complex constructions to achieve a high NRC value. The sound absorbing materials may then require a heavy perimeter frame, or interior support splines, which adds cost and weight. This may require an extensive structural support system for mounting the panels, increases installed costs, and may limit application and practical panel sizes.

Improved acoustical substrates that are light in weight and exhibit high NRC are desirable.

SUMMARY OF THE INVENTION

The present invention provides a light-weight sound absorbing acoustical substrate comprising one or more substrates generally characterized by a substantially open core and high NRC values. In various embodiments, the acoustical substrate preferably has an NRC value of about and including 0.5 to 1.00, more preferably a high NRC equal to or greater than 0.65, and most preferably very high NRC equal to or greater than 0.8. Embodiments of the acoustical substrate may be formed into structures such as ceiling panels, wall panels, free hanging sound absorption treatments, or other products.

An acoustical substrate according to the present disclosure generally includes an inner light-weight core, a first facing layer attached to a first major surface or side of the core, and a second facing layer attached to an opposite second major surface or side of the core. The facing layers may be non-woven or woven glass scrims in some embodiments. In one embodiment, the core may be comprised of a honeycomb structure defining a plurality of cells. The honeycomb core layer may be constructed of paper treated or impregnated with a resin to reduce moisture sensitivity; however, other suitable fibrous or non-fibrous materials may be used. The first and second facing layers may be attached to the honeycomb core layer in some embodiments with a suitable adhesive that is selected (and/or applied in a manner) that retards flame spread and smoke generation so that the honeycomb substrate achieves a Class A fire performance rating.

Embodiments according to the present disclosure further include acoustical structures formed of two or more sound absorbing substrates which may be permanently joined together to form a single composite structure having a greater thickness and higher NRC values than obtainable by a single substrate. A composite acoustical structure may be desirable for certain applications where a high degree of noise suppression and additional stiffness for long spans is beneficial. Such composite acoustical structures therefore include at least two honeycomb or other structured cores, a first outer scrim layer, a second outer scrim, and at least one intermediate scrim layer.

The first and second scrim layers of the substrate are engineered and configured in some embodiments to have an airflow resistance that allow the honeycomb substrate to achieve high NRC values. The airflow resistance of each of the first and second scrim layers may be controlled by any combination of the following: (1) specialty paint coating techniques; (2) adhesive coating techniques; and/or (3) tightness (i.e. porosity) of the scrim layer. The first and second scrim layers can be woven or nonwoven scrims, depending on desired visual aesthetic and impact. Advantageously, the use of scrims having properly engineered airflow resistance eliminates the need for a layer having perforations formed therein, and can be designed to be "acousticly transparent" and "optically opaque."

Despite being lightweight, the honeycomb core advantageously imparts the required structural rigidity to the honeycomb substrate, and thus eliminates the need for a perimeter structural frame, which is generally standard in the art for high NRC panels. Accordingly, in some embodiments, a high NRC acoustical panel according to the present disclosure may be frameless.

Despite the use of the lightweight honeycomb core, the stiffness of this core construction yields a high NRC acoustical substrate according to the present disclosure that is sag resistant even in those embodiments having a single core. Advantageously, this allows formation of relatively large panels (e.g. 4 feet×4 feet or more) with a minimal support structure thereby reducing capital and installation costs.

In one embodiment, an acoustical substrate includes a substantially open core having a plurality of open cells defined by cell walls extending perpendicular to opposing first and second major sides of the core, a first facing layer attached to the first major side of the core, and a second facing layer attached to the second major side of the core. The first facing layer may be porous and has an airflow resistance in a range of about and including 100 to 7500 mks rayls.

In another embodiment, an acoustical substrate includes a substantially open core having a perimeter edge extending around lateral sides of the core, the core formed of a plurality of open cells defined by cell walls extending perpendicular to opposing first and second major sides of the core, the cells walls being formed of paper, a first facing layer attached to the first major side of the core, and a second facing layer attached to the second major side of the core. The first and second facing layers may each be porous and have an airflow resistance in a range of about and including 100 to 7500 mks rayls.

In another embodiment, an acoustical structure includes (i) a first substrate comprising a substantially open first core having a plurality of open cells defined by cell walls extending perpendicular to opposing first and second major sides of the first core, a first facing layer attached to the first major side of the first core, wherein the first facing layer is porous and has an airflow resistance of about and including 100 to 7500 mks rayls, and (ii) a second substrate comprising a substantially open second core having a plurality of open cells defined by cell walls extending perpendicular to opposing first and second major sides of the second core, a second facing layer attached to the second major side of the second core. An interlayer is disposed between the first and second substrates, the first and second substrates being bonded to opposite sides of the interlayer.

BRIEF DESCRIPTION OF THE DRAWINGS

The features of the exemplary embodiments of the present invention will be described with reference to the following drawings, where like elements are labeled similarly, and in which:

FIG. 8 is a chart showing test results for noise reduction coefficients for various acoustical substrate and multi-layered acoustical structure constructions.

Figure 1:
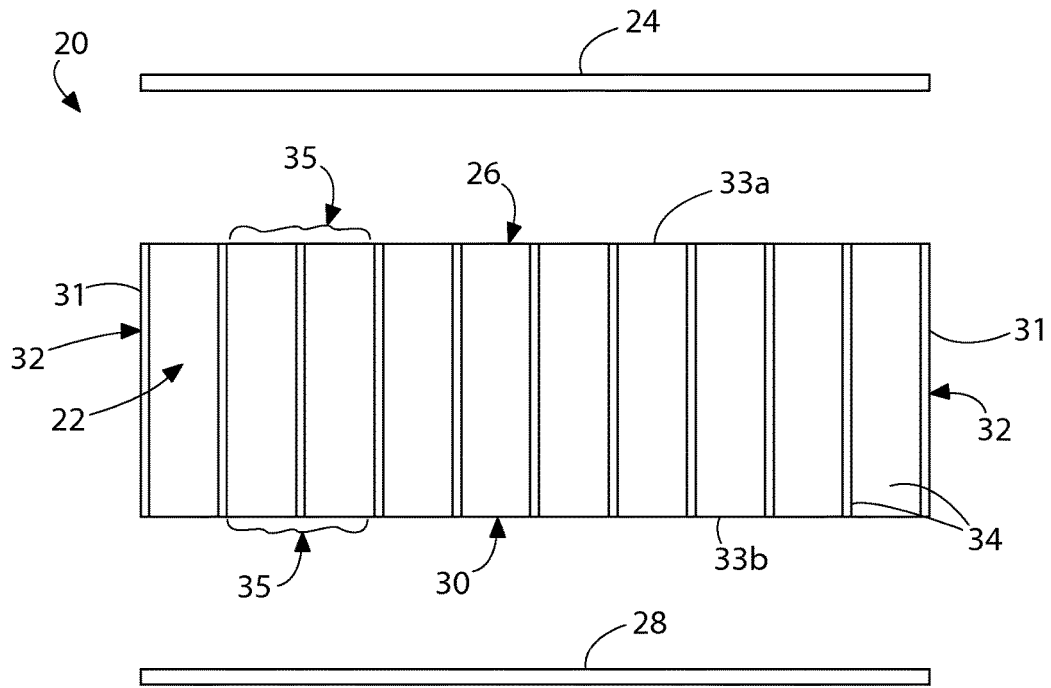
FIG. 1 is an exploded side elevation view of an acoustical substrate according to the present disclosure.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE EMBODIMENTS

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

Figure 2:
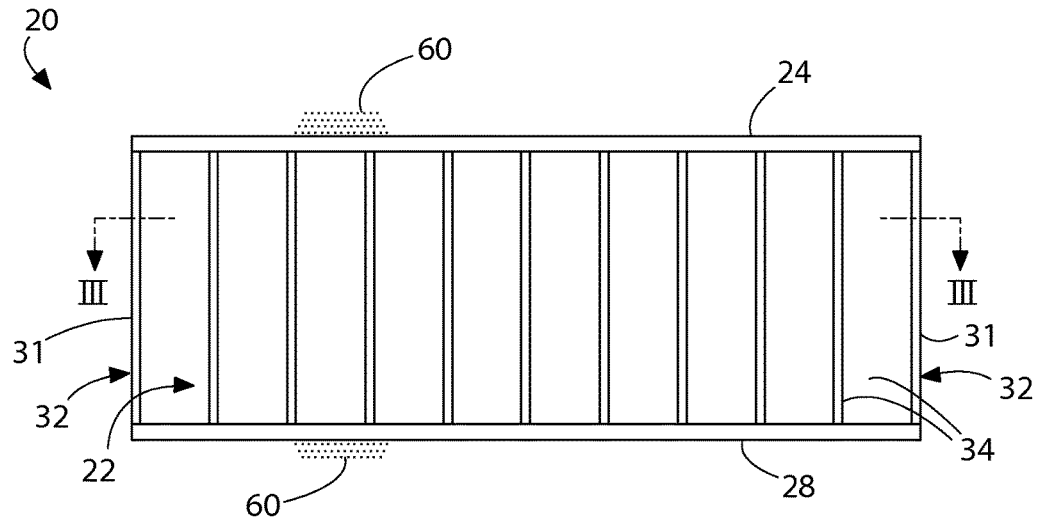
FIG. 2 is an assembled view thereof.

FIGS. 1 and 2 depict one embodiment of an acoustical substrate according to the present disclosure shown in exploded and assembled views, respectively. The acoustical substrate 20 includes an inner core 22, a first outer facing layer 24 joined to a first major side 26 of the core, and a second outer facing layer 28 joined to an opposite second major side 30 of the core. In some embodiments, without limitation, side 26 may be a front side which is exposed to a building space or room environment and side 30 may be a rear side which is concealed from view when the substrate is mounted. Acoustical substrate 20 further includes peripheral lateral sides 32 extending all the around the core 22 which collectively define a perimeter edge 31 of the substrate that in turn defines a length and width. In one embodiment, the perimeter edge may have a square or rectangular edge profile as shown in FIG. 2. Other suitable edge profiles may be provided.

Core

Figure 3:
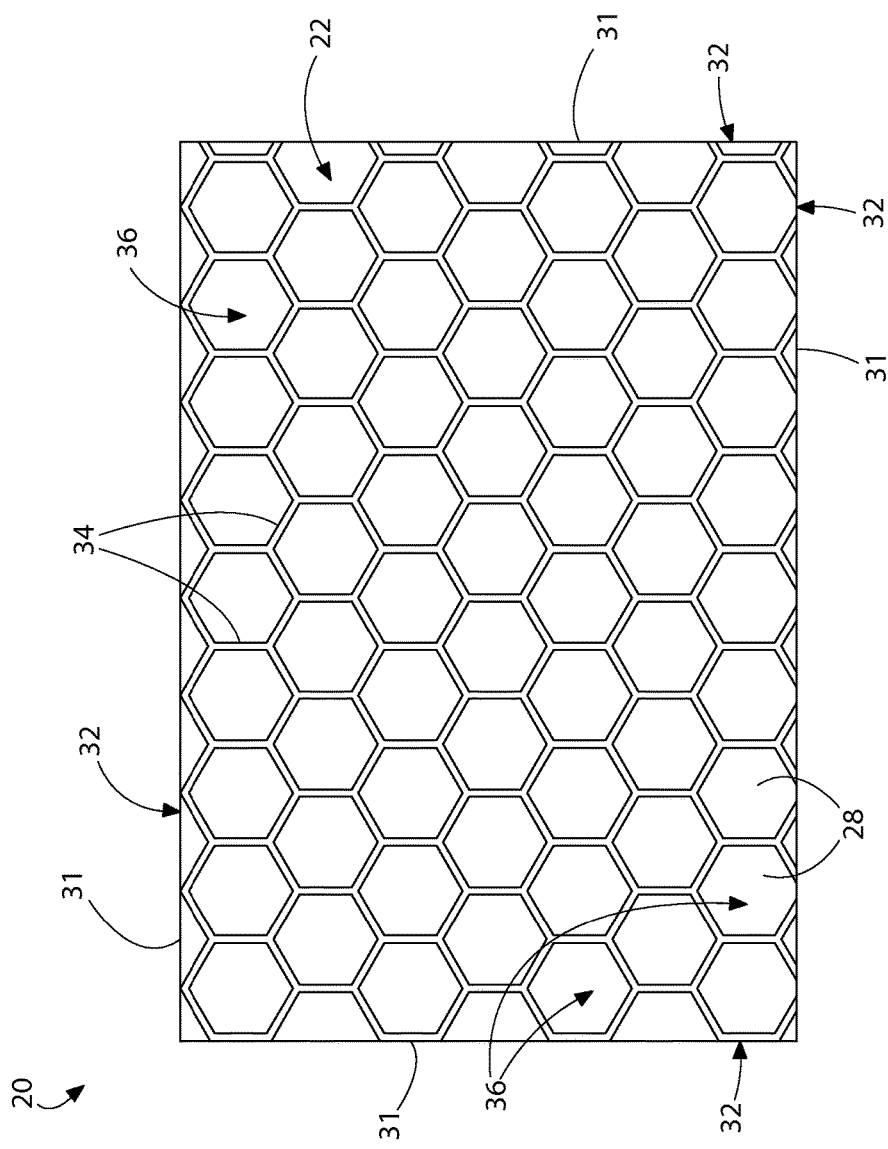
FIG. 3 is a transverse cross-sectional view of the core of FIG. 1 taken along line III-III.

Referring to FIGS. 1-3, the inner core 22 may be a honeycomb structure in configuration having a plurality of interconnected cell walls 34 which form a plurality of open cells 36. The cell walls 34 extend vertically in height between the outer facing layers substantially perpendicular to outer facing layers 24, 28. The cells 36 define openings through the core 22 which extend vertically through the acoustical substrate 20 and perpendicular to the outer facing layers 24 and 28. This arrangement and vertical orientation of the cell openings (i.e. open on the top and bottom ends of each cell) is desirable and beneficial for both acoustical noise suppression and structural stiffening of the substrate. When joined to the outer facing layers 24 and 28, the core forms a structural member analogous to an I-beam construction having stiffness which resists deflection or sag in a direction acting along a vertical axis perpendicular to the facing layers under the weight of the acoustical substrate 20.

In some preferred but non-limiting embodiments, the substrate is frameless on all lateral sides 32 around the perimeter edge 31 of the core 22. Accordingly, in these embodiments the outermost and laterally outward facing rows of cells 36 cells extending all the way around the perimeter edge 31 of the core (regardless of its shape in top plan view) are exposed and their cells walls 34 define the lateral sides 32 of the substrate 20.

Referring to FIGS. 1-3, the cell walls 34 which define the core 22 may be formed from any number of thin, light, and porous or non-porous materials having sufficient stiffness to resist sag. In one embodiment, the cores 22 may be formed by of paper cell walls 34. Paper used to construct cell walls 34 of the core 22 may be at least 20 pound Kraft paper, and in some preferred embodiments 20 to 80 pound Kraft paper (thicknesses of about 0.004 to 0.015 inches) which provides the requisite stiffness to the core without unduly adding weight to the structure. As opposed to other materials, paper is generally more economical and cost-effective as a core sidewall material. However, in other embodiments, it has been found that materials such as lightweight fiberglass and thin aluminum sheet also may perform satisfactorily. Heavy gage material (of any type) is generally easier to work with, but increases weight and cost without marked improvement in any of the core structures desired properties including stiffness. In addition, thicker or heavier gage paper-based materials to form the honeycomb core adds to the amount of combustible material present in the structure and thus has a detrimental effect on fire performance. Accordingly, a balance between the requisite thickness to resist sag and these latter factors is appropriate when selecting the material for cell walls 34 of core 22.

Any suitable sizes cell 36 may be used for core 22. In some preferred embodiments, cell width or diameter sizes forming the honeycomb structure may be from about ¼ inch to 3 inches, but more preferably from about ¼ inch to and including 1 inch in diameter (noting that the hexagon-shaped cells approximate a circle in shape and a diameter). Cell diameters beyond the foregoing range are suitable, but less desirable because issues may arise with surface deflection (pillowing), unsupported edge damage, and de-lamination.

Cell heights in some preferred embodiments may be from about and including 0.20 inches to 4 inches. Cells heights from ⅜ inch to and including 1.5 inches have been tested and provide equivalent performance in terms of acoustical absorption. In certain embodiments, cell heights in the higher range from about 0.8 to 1.25 inches have been tested for sag and provide good sag resistance. Other suitable heights, however, may be used provided the sag resistance is adequate for the given size acoustical panel to be constructed.

For a given acoustical substrate 20 which may be formed into an acoustical panel or treatment of suitable shape (e.g. polygonal, circular, or other), the inner core 22 forms a substantially open structure based on the three-dimensional total volume of the core delimited by the lateral sidewalls 32 and the major sides 26, 30 of the core. In some embodiments, the open volume of the cells preferably may comprise 90% or more of the total volume occupied by the core. As representative examples, without limitation, the open volume of the cells 36 will account for approximately 99% of the total volume of the core for 1 inch diameter cells, and approximately 98% for ½ inch diameter cells.

In some embodiments, the paper-based cell walls 34 of core 22 may treated or impregnated with a resin which is intended for moisture, fungus, and insect protection and fire protection. A phenolic resin or other suitable resin may be used. To enhance fire performance, the cell walls 34 may be treated with a fire retardant such as a polyphosphate. In other embodiments, the paper cell walls may be untreated or uncoated.

Referring to FIGS. 1 and 2, the outer facing layers 24 and 28 may be permanently bonded to core 22 using a suitable industrial adhesive 35 which is applied to the exposed upper and lower edges 33*a*, 33*b* of the core cell walls 34. Suitable adhesives includes Swift® tak adhesive from H.B. Fuller Company and others which may be rolled or otherwise applied onto the upper and lower edges of the core cell walls. The amount of adhesive used is preferably that which achieves a bond between the core and facing layers to produce sufficient peel strength. For the above described assembly, the failure point during a peel test is typically the internal cohesion of the scrim layer itself. Coating the back side of the scrim with either a paint or adhesive layer has been found to significantly enhance peel strength and the durability of the finished assembly. Care must be taken when depositing this additional coating layer so as not to close the surface to air permeability as that would negatively impact acoustical absorption. In one embodiment, the acoustical substrate 20 may be formed by placing the first facing layer 24 (back side up) on a curvilinear mandrel and then placing the adhesive edge-coated core (e.g. upper edges 33*a*) onto the facing layer to make abutting contact. Next, the second facing layer 28 may be attached to the adhesive coated lower edges 33*b* of the core in a similar manner to complete the structure of the acoustical substrate 20. By applying this technique one can easily craft non-planar acoustical structures (complex curvilinear panels), something that is very difficult to achieve with standard acoustical materials and assembly techniques. It should be recognized that the assembled acoustical substrate may also be considered and referred to as an acoustical panel.

Figure 4:
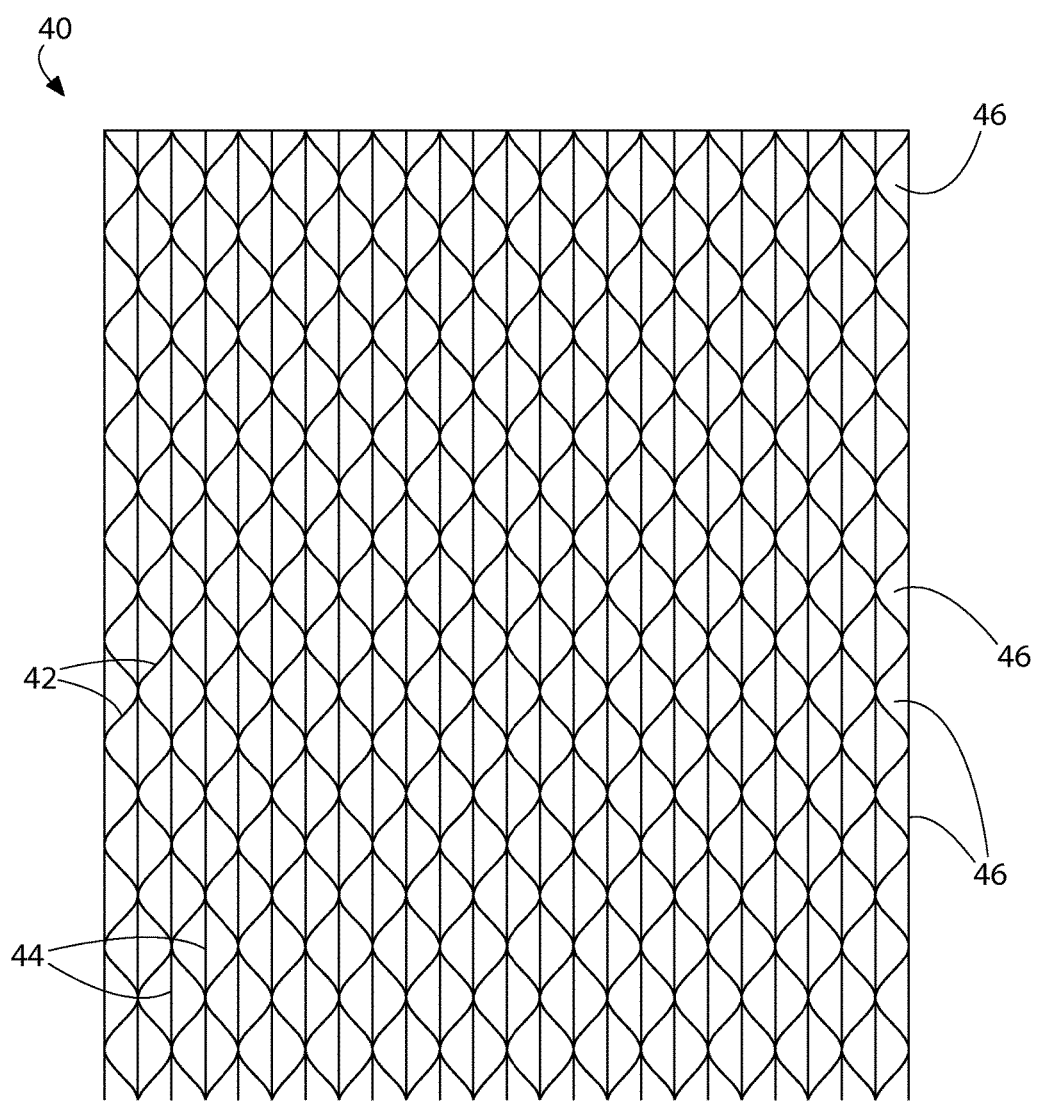
FIG. 4 is a top plan view of a first alternate core cell configuration.
Figure 5:
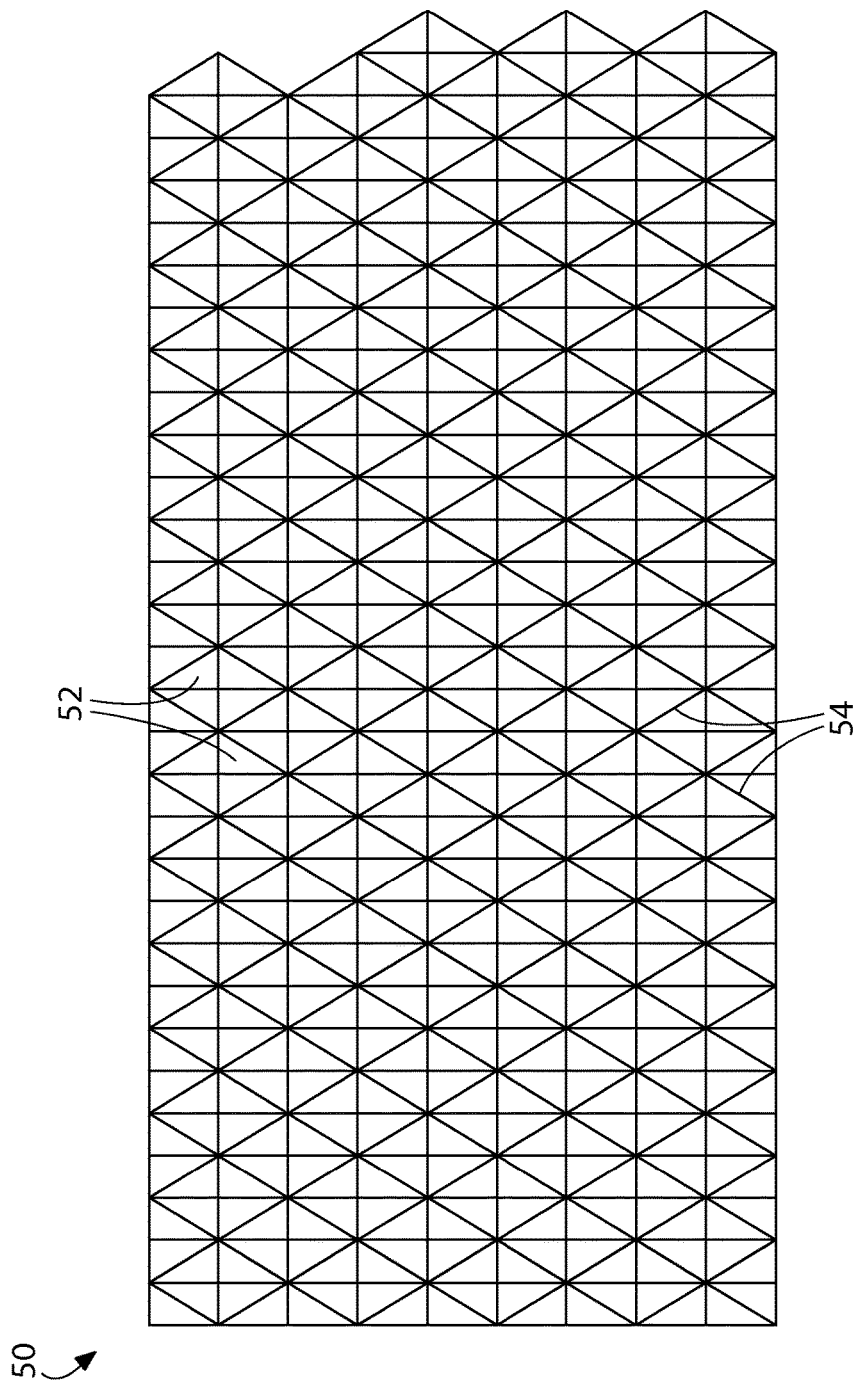
FIG. 5 is a top plan view of a second alternate core cell configuration.

It will be appreciated that core configurations other than a hexagon-shaped honeycomb structure (in transverse cross section to the vertical direction) as shown in FIG. 3 may be used. For example, in some embodiments, a core 40 may be used having a corrugated construction as shown in FIG. 4 may be formed of multiple "W-shaped" sinusoidal curved or undulating cell walls 42 sandwiched and bonded between alternating rows of longitudinally extending straight cell walls 44. Open cells 46 are formed in the openings between the undulating cell walls and straight cell walls. Preferably, the corrugated core construction is oriented so that the cells open vertically at the top and bottom edges of the core similar to the orientation of core 22 for noise suppression performance and structural stiffness to resist sag or bending. In another possible embodiment, a core 50 having triangular shaped cells 52 formed by cell walls 54 may be provided as shown in FIG. 5. Suitable cores with triangular cells 52 may be obtained from Tricel Honeycomb Corporation. Accordingly, many suitable shapes of cells and cores may be used.

In one embodiment, the honeycomb core 22 and facing layers 24, 28 advantageously provide a light-weight stiff structure sufficient to resist sag without the need for heavy perimeter frames to provide additional support. Accordingly, the acoustical substrate 20 may be frameless from perimeter edge 31 to perimeter edge of the core without the need or cost for any perimeter support frame permanently joined to the substrate itself. This conveniently allows the acoustical substrate 20 to be cut to size as needed on site during installation by the installers. Acoustical substrates 20 according to the present disclosure therefore are particularly advantageous for retrofit applications where existing acoustical panels in a support grid system are to be replaced.

Facing Layers (Scrim)

Referring to FIGS. 1-2, the outer facing layers 24 and 28 in some embodiments may be a scrim comprised of laminated non-woven glass fibers in a resin matrix. This construction is suitable for high end acoustical panels to impart a smooth visual appearance, durability, and dimensional stability while maintaining the appropriate acoustical porosity. In one embodiment, the outer facing layers 24 and 28 do not contain mechanically formed or fabricated perforations but instead relies on the porosity of the facing layer material construction itself to achieve the desired airflow resistance. The facing layers 24, 28 may have representative thicknesses ranging from about and including 0.008 to 0.050 inches depending on considerations such as cost, weight, and others. In one embodiment, the thickness may nominally be about 0.030 inches. Uncoated scrims will have weight's that typically fall in the range from about 30 to 150 grams/m$^2$, have tensile strengths greater than 150 N/50 mm and be made using fibers with a nominal diameter of 10 μm. Scrims such as those described are readily available from suppliers such as Owens Corning, Lydall, Ahistrom and Johns Manville.

The specific airflow resistance of an acoustical structure is a permeability or porosity property that determines the sound-absorptive and sound-transmitting properties of the structure. Outer facing layers 24 and 28 with greater porosity allows sound to pass through the layer to the core rather than being reflected back into the room thereby improving sound absorption and the NRC value of the acoustical substrate 20. Specific airflow resistance may be determined by ASTM standard C522 and is measured in units of mks rayls (Pa·s/m). This test method is designed for the measurement of values of specific airflow resistance with linear airflow velocities ranging from 0.5 to 50 mm/s and pressure differences across the specimen ranging from 0.1 to 250 Pa. Increasingly higher airflow resistance values represent correspondingly denser and less porous facings. Accordingly, by controlling the specific airflow resistance of the facing layers 24 and 28, one can control and modify the NRC value to achieve the desired sound absorption performance of the composite acoustical substrate 20. These findings were counterintuitive in that for a typical acoustical product one must minimize airflow resistance in order to maximize acoustical absorption. In this particular structure it was found that sound absorption would increase with air flow resistance, seemingly peaking at the point where one or more of the acoustical layers had an air flow resistance on the order of 500 MKS Rayls. Acoustical absorption would drop off as the resistance value was decreased as the structure would become too open an unable to dissipate acoustical energy through frictional losses. It is also predicted that acoustical absorption will also decrease when the air flow resistance of the layers in the assembly is above 500 MKS Rayls due to an increased portion of the sound energy being reflected back into the space rather than absorbed.

In some embodiments, a specific airflow resistance value in a range from about and including 100 to 500 mks rayls for at least one of outer facing layers 24 and 28 has been determined by the inventors to be effective in achieving the desired acoustical sound absorption performance (i.e. high NRC values) of the acoustical substrate 20. The airflow resistance of the remaining outer facing layer 24 or 28 may be varied from 0 mks rayls to infinity (i.e. non-porous) in order to achieve different NRC values for the acoustical substrate. In one embodiment, outer facing layers 24, 28 may each have an airflow resistance of about 300 mks rayls.

The airflow resistance of each of the outer facing layers 24 and 28 may be controlled by a variety of techniques, including without limitation applying specialty paint coatings, adhesive coating techniques, and/or the tightness (porosity) of the facing layer material composition itself. In one embodiment, referring to FIG. 2, the exposed surfaces of the outer facing layers 24, 28 may be coated or painted in accordance with U.S. Pat. No. 5,888,626, which is incorporated herein by reference in its entirety, with a high solids acrylic latex paint coating 60 having a sufficiently porous composition to achieve an airflow resistance in the foregoing desired range from about and including 100 to 7500 mks rayls in the facing layers that is generally acoustically transparent and optically opaque for aesthetic purposes. A paint such as Durabrite brand or other suitable paints may be used. In one embodiment, the paint may have a high solids/low liquid suspension ranging from about 70-85% solids by weight. A representative high solids paint formulation that may be used, without limitation, is as follows: 6.8% [4-20% range] acrylic latex emulsion, 33.78% [30-55% range] slurry limestone, 50.95% [30-55% range] limestone (40 mesh), 1.41% [1-8% range] titanium dioxide solids, and 7.06% [2-8% range] liquid-water. Representative paint application rates that may be used are 40-60 grams/square feet. Other coatings such as adhesives or low solids paints can also be used to achieve the air flow resistance necessary to achieve optimal acoustical absorption, the key attribute being that it remains discontinuous and thus capable of imparting the appropriate air flow resistance to the finished product.

Other suitable materials and scrims may be used for outer facing layers 24, 28 such as without limitation those made from natural or man-made organic fibers, glass/organic fiber combinations, inorganic fibers such as rockwool, and other fabric like materials. In some embodiments, a woven glass scrim may be used. The key attribute for acoustics is the air flow resistance of the finished surfaces. This flow resistance can either be an inherent attribute of the facing material or can be imparted to the facing material via a coating layer. The facing materials should be at least somewhat flexible in order to simplify the manufacturing assembly operation and preferentially of limited combustibility in order to achieve the fire resistance necessary for interior finishes. The controlled airflow resistance of the outer layers is a key differentiator between this invention and the prior art. Although honeycomb cores have been used to form acoustical structures, in all of those cases the surfaces of said structures were crafted from either solid films or thin layers of materials that were impervious to air flow (i.e. reflective surfaces). Acoustical performance was achieved by punching holes in the surface and forming Helmholtz resonators. Such resonators absorb sound in very narrow frequency bands, with limits are defined by hole diameter, neck length and chamber volume. Unlike Helmholtz resonators, this invention is capable of achieving sound absorption across the full spectrum of audible frequencies.

Acoustical Panel

Acoustical panels formed of acoustical substrate 20 in some embodiments may have representative thicknesses (i.e. facing layers and core) ranging from about and including 0.375 to 3 inches, with a preferred but non-limiting range of about and including 0.6 to 1.5 inches. Panels of various desired perimetric dimensions (e.g. width and length) may be formed using acoustical substrate 20. In some embodiments, without limitation, acoustical panels may be 4 ft.×4 ft., 4 ft.×8 ft., and 4 ft.×12 ft. with the larger sizes being provided with progressively taller core cell heights to resist sag.

Four cycle sag tests (relative humidity of 35 RH to 90 RH) conducted on multiple acoustical substrates 20 formed according to the present disclosure yielded acceptable final deflection values of less than 0.035 inches for a 2 ft.×4 ft. panel. This indicates that the substrate construction using a frameless light-weight open core and outer facing layers as described herein possess sufficient structural strength in comparison with their heavier and framed counterparts. Said results were achieved from panels fabricated using honeycomb with the structure shown in FIG. 4 made from resin treated paper and having 1 inch cell height, 0.75 inch cell size, and painted glass scrim facings with 150 Rayls on both sides. Similar results were also achieved from panels fabricated using honeycomb with the structure shown in FIG. 3 made from untreated paper with core cell height of 0.75 inch, a cell size of 1 inch and facings with a resistances of 500 Rayls on one side and 150 Rayls on the other.

Acoustical panels made of acoustical substrate 20 may be formed into in a plurality of configurations as desired for a given application sound absorption and aesthetic needs, including for example, without limitation, polygonal, square, ellipsoidal, circle, hexagon, trapezoid, etc., and with various side profiles including flat, convex, concave, and combinations thereof. Accordingly, the invention is not limited by the shape of the acoustical substrate.

Multiple Core Acoustical Structure

Figure 6:
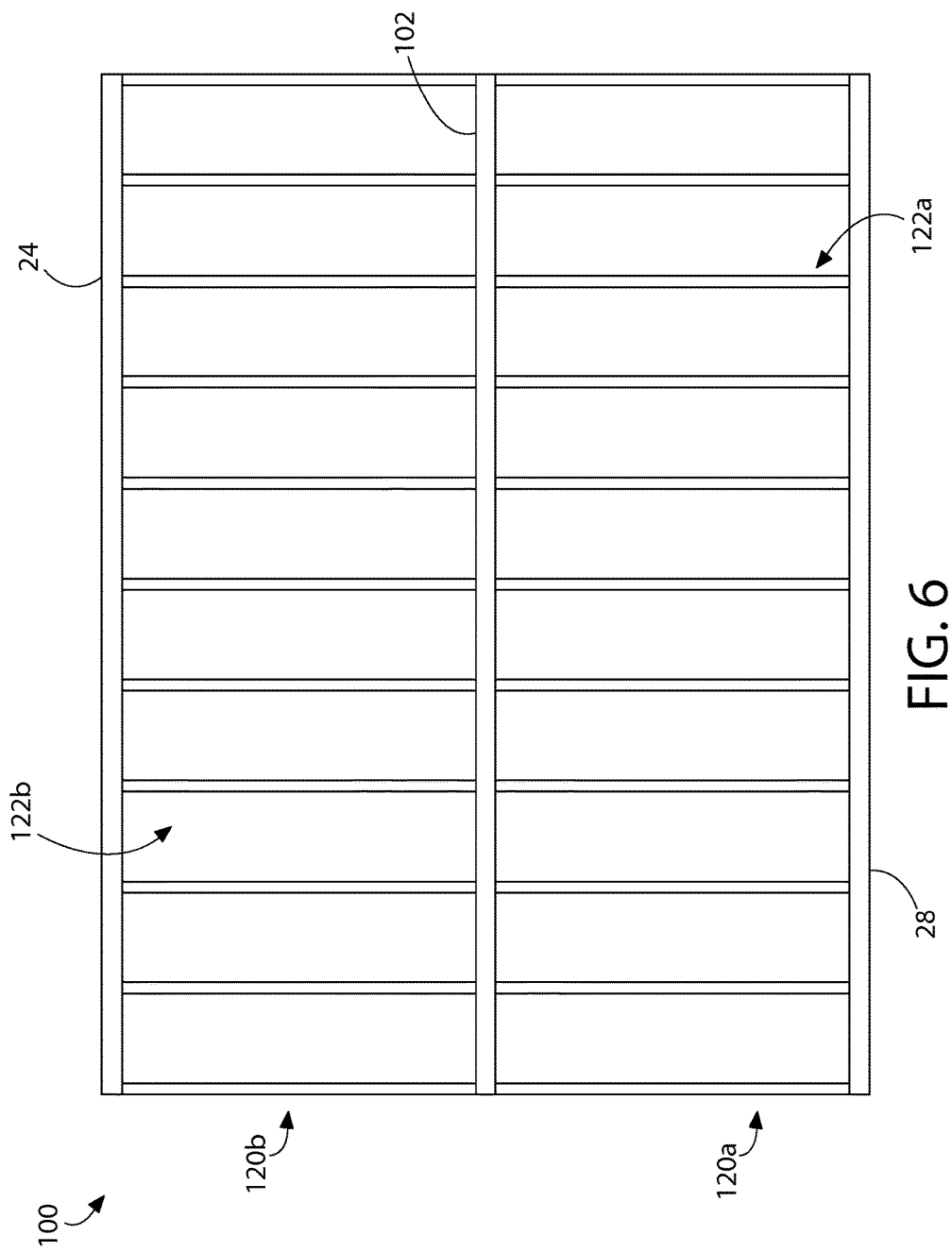
FIG. 6 is side elevation view of a multi-layer composite acoustical structure formed of multiple cores of FIG. 1 with outer facing layers and an interlayer between the cores.

According to another aspect of the invention, a multi-layered acoustical structure 100 is provided by coupling two or more acoustical substrates 20 together as shown in FIG. 6. In a preferred construction of this embodiment, the acoustical structure 100 includes a lower acoustical substrate 120a and an upper acoustical substrate 120b. In the fabrication process, at least one intermediate facing interlayer 102 is bonded between core 122a of acoustical substrate 120a and core 122b of acoustical substrate 120b on opposite sides of the interlayer. In alternate less preferred but still suitable constructions, one of the outer facing layers 24 or 28 of each acoustical substrate 120a and 120b may simply be abutted and bonded together by a suitable adhesive. This construction, however, may increase production costs and weight, and affect the sound absorption performance of the acoustical structure 100 which must sonically account for the additional intermediate facing layer. Accordingly, a single intermediate facing interlayer 102 is desired when possible.

In contrast to single core acoustical structures, the multi-layered construction with multiple cores advantageously provides the opportunity to increase the overall sound absorption performance (i.e. NRC) and/or the stiffness of the acoustical structure 100 to resist deflection or sag over greater unsupported spans or distances. The multi-layered construction allows the attainment of both high sound absorption and high sound attenuation values in a simple to produce, low cost composite structure. This approach also allows for higher sound absorption values in some cases than may be attained from a single honeycomb or other shaped core acoustical panel.

It is generally difficult to achieve both high sound absorption and high sound attenuation values in a single product since the former requires a high porosity and the latter mass (or high density). Those prior products that can achieve both are typically very expensive to produce, being crafted from thick dense layers of mineral fiber. Advantageously, decoupling sound absorption from the structure and material make-up of the panel enables the achievement of both high attenuation and high absorption in a single product.

Creating a structure with three or more facing layers provides additional sites for sound energy dissipation. For the high attenuation structure, the middle or intermediate facing interlayer 102 provides an apparent thickness and additional site for sound energy loss to the impinging sound waves, thereby providing acoustical performance benefits. In the low attention structure, the presence of three layer changes the apparent stiffness of the structure and thus may favorably impact the coincidence dip (i.e. undesired dip in sound transmission loss performance at the particular frequency where the panel inherently resonates/vibrates resonates based on its construction when the incoming sound wave is at that same frequency, thereby causing the sound to be transmitted through the medium instead of effectively absorbed). By moving the coincidence dip away from its occurrence at an undesired frequency (e.g. 500 Hz) by using the composite acoustical structure 100, the mid frequency sound absorption is beneficially enhanced. Sound absorption at 500 Hz is particularly significant as is one of the four frequencies used to calculate sound absorption and falls in the mid range of human hearing.

The interlayer 102 may constructed similarly to and of the same material as outer facing layers 24 and 28 described herein and have similar dimensions and airflow resistance ratings. Accordingly, interlayer 102 may have an airflow resistance in a range from about and including 100 to 500 mks rayls all similarly to outer facing layers 24 and 28. In various embodiments and combinations used in the acoustical structure 100, the interlayer 102 may have an airflow resistance which is the same as or different than either one or both of outer facing layers 24 and 28. In other embodiments, the interlayer 102 may be constructed differently than and/or of different materials than outer facing layers 24 and 28 described herein and have different dimensions and/or airflow resistance. Any combinations of the foregoing constructions may be used for outer facing layers 24 and 28 and interlayer 102 depending on the acoustic performance desired, sag resistance, etc.

Although FIG. 6 described herein includes two cores, it will be appreciated that other multi-layered constructions may be provided in accordance with the concept of acoustical structure 100 having three or more cores. Accordingly, the invention is not limited to a dual core acoustical structure.

Test Results

Figure 7:
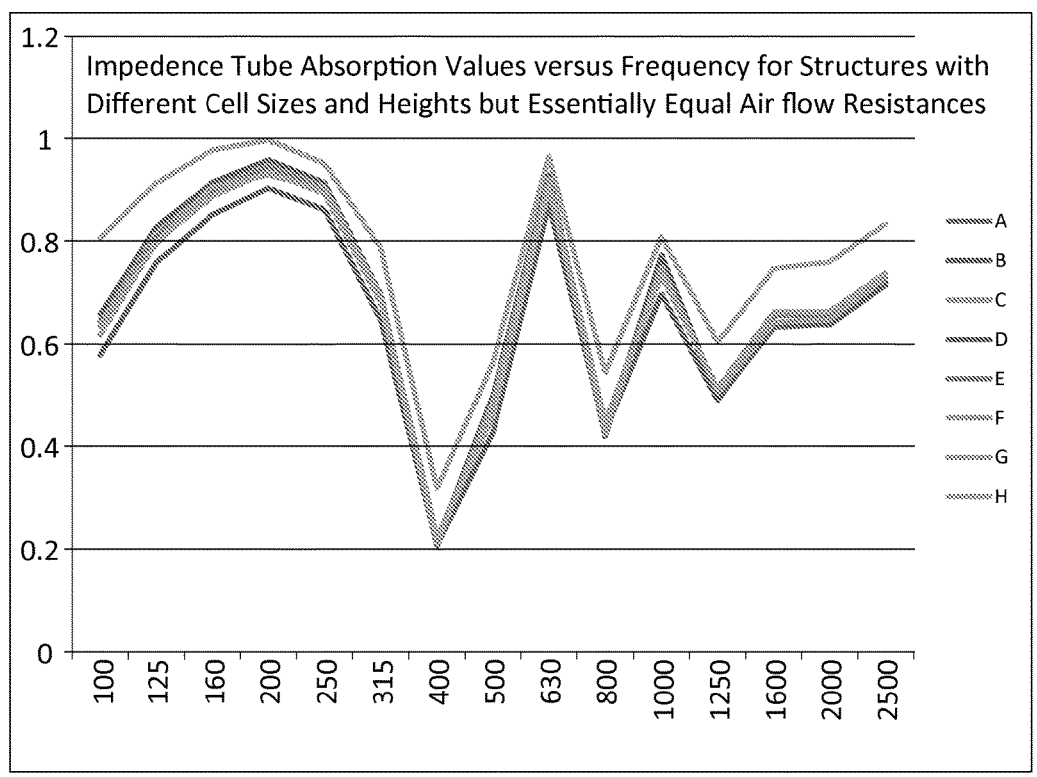
FIG. 7 is a graph showing noise reduction coefficient versus frequency associated with testing of the present acoustical substrate and varying cells heights and sizes.

Sound absorption tests were conducted on acoustical substrate 20 having a single open core 22 to determine the impact of cell height, size, shape and construction material. FIG. 7 contains a graph showing the sound absorption values across a range of frequencies obtained from a variety of honeycomb structures. The absorption values were determined using the impedance tube method described in ASTM Standard C384. A table of describing the cell heights, cell sizes and cell sizes is also included. The uppermost line of the graph represents the Category H construction and the lowermost line of the graph represents the Category D construction. The remaining Categories are closely coupled between the Category D and H lines as shown. What is noteworthy is that the only factor that imparts a notable change in the sound absorption curve is the airflow resistance of the surfacing material (category H). The honeycomb structure is essentially functioning as a spacer for the acoustically absorptive scrim layers.

FIG. 8 is a chart showing the sound absorption values or NRC for various single open core constructions (FIG. 2, acoustical substrate 20) and multi-layer open core acoustical structures (FIG. 6, acoustical structure 100) determined by ASTM standard C423. As noted in the chart, the multi-layer acoustical structures such as shown in FIG. 6 tended to yield higher NRC values. The chart also shows the impact of varying the airflow resistance of the front facing layer 24 ("Front Surface"), rear facing layer 28 ("Back Surface"), and intermediate facing layer 102 ("Middle Layer") with the front and back designations indicating the facing layers which are closest to the sound and farthest, respectively. For the multi-layer acoustical structure 100, the NRC value (average) is preferably greater than 0.85, and more preferably greater than 0.90. The NRC value used to describe the acoustical performance of a given material is determined from the average of the sound absorption values at frequencies of 250, 500, 1000, and 2000 Hz.

It should be noted in FIG. 8 that the two cell sizes (i.e. diameters) listed in the chart for each of the last three entries indicate that the lower acoustical substrate 120b and upper acoustical substrate 120a had cores 122b and 122a respectively with cells of different sizes in width or diameter (i.e.

0.50 inches and 1.00 inches). In other possible embodiments, the cell widths or diameters may be the same in each core 122a, 122b. In addition, in some embodiments the shape of the cells may be different in the multiple cores (for example, without limitation honeycomb and triangular, honeycomb and corrugated, various combinations thereof, and other shapes). Different cell heights may be also be used in each core. In some embodiments, the height of the cells in each 36 in each core 122a, 122b may be the same or different. Furthermore, the materials used for cell walls 34 may be the same or different in each core 122a, 122b (e.g. Kraft paper, fiberglass, aluminum, etc.) Accordingly, the use and possible combinations of all of these foregoing design parameters in an acoustical structure 100 advantageously provide a high degree of flexibility in achieving the desired sound absorption performance and sag resistance for a given application.

It may further be noted in FIG. 8 that either in the single core acoustical substrate 20 or multiple core acoustical structure 100, at least any one of the outer facing layers 24 and 28 or interlayer 102 may be configured and constructed to have an "infinite" airflow rate meaning that the layer/interlayer is a non-porous structure which does not allow air to pass through. In the multiple core acoustical structures 100 shown in the chart of FIG. 8, it can be seen that at least making the back layer non-porous in some embodiments is not extremely detrimental to the NRC or sound absorption rating.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. An acoustical substrate having a first major surface opposite a second major surface, the acoustical substrate comprising:
    a substantially open core having a plurality of open cells defined by cell walls extending perpendicular to opposing first and second major sides of the core, the first major side being substantially planar;
    a first facing layer having an upper surface opposite a lower surface, the lower surface being substantially planar and attached directly to and contacting the first major side of the core, the first facing layer forming the first major surface; and
    a second facing layer attached to the second major side of the core, the second facing layer forming the second major surface,
    wherein the first facing layer is porous and has an airflow resistance in a range of about and including 100 to 7500 mks rayls.

2. The acoustical substrate of claim 1, wherein the acoustical substrate has a noise reduction coefficient equal to or greater than 0.5.

3. The acoustical substrate of claim 1, wherein the first facing layer is coated with a high solids paint which configures the first facing layer to have the airflow resistance in a range of about and including 100 to 7500 mks rayls.

4. The acoustical substrate of claim 1, wherein the first facing layer is comprised of laminated non-woven glass fibers.

5. The acoustical substrate of claim 1, wherein the first and second facing layers have a thickness ranging from about and including 0.010 to 0.050 inches.

6. The acoustical substrate of claim 1, wherein the core is formed of 20 to 80 pound Kraft paper.

7. The acoustical substrate of claim 1, wherein the core is formed of fiberglass or aluminum sheet.

8. The acoustical substrate of claim 1, wherein the core has at least one of honeycomb shaped cells and triangular shaped cells.

9. The acoustical substrate of claim 1, wherein the core has a corrugated construction with cells having open ends disposed proximate to the first and second major sides of the core.

10. The acoustical substrate of claim 1, wherein cells create an open volume of the core which accounts for 90% or more of the total volume occupied by the core.

11. The acoustical substrate of claim 1, wherein the second facing layer is porous and has an airflow resistance in a range of about and including 100 to 1000 mks rayls.

12. The acoustical substrate of claim 1, wherein the first facing layer is formed of a woven glass scrim.

13. An acoustical substrate comprising:
    a substantially open core having a perimeter edge extending around lateral sides of the core, the core formed of a plurality of open cells defined by cell walls extending perpendicular to opposing first and second major sides of the core, the cells walls being formed of paper;
    a first facing layer attached directly to and contacting the first major side of the core with adhesive; and
    a second facing layer attached to the second major side of the core with adhesive,
    wherein the first and second facing layers are each porous and have an airflow resistance in a range of about and including 100 to 7500 mks rayls.

14. The acoustical substrate of claim 13, wherein the acoustical substrate has a noise reduction coefficient equal to or greater than 0.65.

15. The acoustical substrate of claim 13, wherein the first and second facing layers are coated with a high solids paint which configures the facing layers to have the airflow resistance in a range of about and including 100 to 7500 mks rayls.

16. The acoustical substrate of claim 13, wherein the first facing layer is comprised of laminated non-woven glass fibers.

17. The acoustical substrate of claim 13, wherein the first and second facing layers have a thickness ranging from about and including 0.010 to 0.050 inches.

18. The acoustical substrate of claim 13, wherein the core is formed of 20 to 80 pound Kraft paper.

19. The acoustical substrate of claim 13, wherein the substrate is frameless on all lateral sides around the perimeter edge of the core.

20. An acoustical structure comprising:
a first substrate comprising a substantially open first core having a plurality of first open cells defined by cell walls extending perpendicular to opposing first and second major sides of the first core, the first major side being substantially planar, the first open cells having a first diameter;
a first facing layer having an upper surface opposite a lower surface, the lower surface being substantially planar and attached directly to and contacting the first major side of the first core, wherein the first facing layer is porous and has an airflow resistance of about and including 100 to 1000 mks rayls;
a second substrate comprising a substantially open second core having a plurality of second open cells defined by cell walls extending perpendicular to opposing first and second major sides of the second core, the second open cells having a second diameter;
a second facing layer attached to the second major side of the second core; and
an interlayer disposed between the first and second substrates, the first and second substrates being bonded to opposite sides of the interlayer; wherein the first diameter and second diameter are not equal.

* * * * *